US012496908B2

(12) United States Patent
Koglsperger et al.

(10) Patent No.: US 12,496,908 B2
(45) Date of Patent: Dec. 16, 2025

(54) BRAKING DEVICE, IN PARTICULAR FOR ELECTRICALLY DRIVEN MOTOR VEHICLES

(71) Applicant: LSP INNOVATIVE AUTOMOTIVE SYSTEMS GMBH, Unterfohring (DE)

(72) Inventors: Christian Koglsperger, Geretsried (DE); Simon Zollitsch, Munich (DE); Thomas Leiber, Rogoznica (HR)

(73) Assignee: LSP INNOVATIVE AUTOMOTIVE SYSTEMS GMBH, Unterfohring (DE)

( * ) Notice: Subject to any disclaimer, the term of this patent is extended or adjusted under 35 U.S.C. 154(b) by 681 days.

(21) Appl. No.: 17/638,235

(22) PCT Filed: Aug. 20, 2020

(86) PCT No.: PCT/EP2020/073312
§ 371 (c)(1),
(2) Date: Feb. 25, 2022

(87) PCT Pub. No.: WO2021/037658
PCT Pub. Date: Mar. 4, 2021

(65) Prior Publication Data
US 2022/0314813 A1    Oct. 6, 2022

(30) Foreign Application Priority Data

Aug. 30, 2019    (DE) .................... 10 2019 123 351.8

(51) Int. Cl.
*B60L 7/26*    (2006.01)
*B60T 13/58*    (2006.01)
*B60T 8/40*    (2006.01)

(52) U.S. Cl.
CPC .............. *B60L 7/26* (2013.01); *B60T 13/586* (2013.01); *B60T 8/4081* (2013.01);
(Continued)

(58) Field of Classification Search
None
See application file for complete search history.

(56) References Cited

U.S. PATENT DOCUMENTS 5,318,355 A    6/1994   Asanuma et al.
8,371,661 B2   2/2013   Leiber et al.
(Continued)

FOREIGN PATENT DOCUMENTS

CN    110167806 A   *  8/2019  ............ B60T 13/146
DE    102005018649 A1    10/2006
(Continued)

OTHER PUBLICATIONS

KR1020190096146A—English machine translation (Year: 2019).*
(Continued)

*Primary Examiner* — Melanie Torres Williams
(74) *Attorney, Agent, or Firm* — Panitch Schwarze Belisario & Nadel LLP (57) ABSTRACT

A brake device for a motor vehicle with two axles, including at least one axle with an electric traction motor for driving and braking at least one wheel arranged on the axle, where energy can be recovered by means of the traction motor during braking. Each wheel has a wheel brake. A pressure supply is provided in the form of a piston-cylinder unit, which can both build up pressure and reduce pressure. The pressure supply forms part of a pressure supply device, having at least two connections, switchably connected by respective valves, to the brake circuits, an ABS/ESP unit and/or an actuating unit. An open-loop and closed-loop control device controls the at least one electric traction motor and components of the pressure supply device such that a braking deceleration can be set by closed-loop control for each brake circuit and/or each axle, with different braking torques at the respective axles.

15 Claims, 4 Drawing Sheets

(52) U.S. Cl.
CPC ....... *B60T 2270/10* (2013.01); *B60T 2270/30* (2013.01); *B60T 2270/604* (2013.01)

(56) References Cited

U.S. PATENT DOCUMENTS

| | | | |
|---|---|---|---|
| 8,540,324 | B2 | 9/2013 | Leiber et al. |
| 9,981,645 | B2 | 5/2018 | Kim et al. |
| 2019/0016324 | A1* | 1/2019 | Wagner .................. B60T 17/16 |
| 2019/0031165 | A1* | 1/2019 | Besier .................... B60T 8/348 |
| 2019/0039579 | A1* | 2/2019 | Ohkubo ................ B60T 13/586 |

FOREIGN PATENT DOCUMENTS

| | | | | |
|---|---|---|---|---|
| DE | 102005055751 | A1 | | 11/2006 |
| DE | 102011084391 | A1 | | 5/2012 |
| DE | 102012217825 | A1 | | 4/2014 |
| DE | 102013224313 | A1 | | 9/2014 |
| DE | 102013208703 | A1 | | 11/2014 |
| DE | 102013209175 | A1 * | 11/2014 | ............ B60L 11/14 |
| DE | 102014221036 | A1 | | 4/2016 |
| DE | 202015008975 | U1 | | 6/2016 |
| DE | 102015103859 | A1 | | 9/2016 |
| DE | 102017113563 | A1 | | 12/2018 |
| DE | 102005063659 | B3 | | 6/2019 |
| EP | 2167359 | A1 | | 3/2010 |
| EP | 1874602 | B1 | | 12/2012 |
| EP | 1907253 | B1 | | 7/2013 |
| EP | 3328695 | A1 | | 6/2018 |
| EP | 3333028 | A1 * | 6/2018 | ............ B60T 13/662 |
| KR | 1020190096146 | A * | 8/2019 | |
| WO | 2008155045 | A1 | | 12/2008 |
| WO | 2012059175 | A1 | | 5/2012 |
| WO | 2017016705 | A1 | | 2/2017 |
| WO | 2018215397 | A1 | | 11/2018 |
| WO | 2018233854 | A1 | | 12/2018 |
| WO | 2019002475 | A1 | | 1/2019 |

OTHER PUBLICATIONS

CN-110167806-A—English Machine Translation (Year: 2019).*
Search Report issued Jul. 9, 2020 in DE Application No. 10 2019 123 351.8.
Int'l Search Report and Written Opinion issued Nov. 27, 2020 in Int'l Application No. PCT/EP2020/073312, English translation of Int'l Search Report only.

* cited by examiner

BRAKING DEVICE, IN PARTICULAR FOR ELECTRICALLY DRIVEN MOTOR VEHICLES

CROSS-REFERENCE TO RELATED APPLICATION

This application is a Section 371 of International Application No. PCT/EP2020/073312, filed Aug. 20, 2020, which was published in the German language on Mar. 4, 2021 under International Publication No. WO 2021/037658 A1, which claims priority under 35 U.S.C. § 119(b) to German Patent Application No. 10 2019 123 351.8, filed Aug. 30, 2019, the disclosures of which are incorporated herein by reference.

The present invention relates to a brake device for a motor vehicle with two axles, wherein at least one axle has an electric traction motor for driving and braking the at least one wheel arranged on the axle, and energy can be recovered by means of the traction motor during braking, each wheel has a wheel brake, a pressure supply having a pressure supply unit which is driven by an electric motor, wherein the pressure supply can both build up pressure and reduce pressure, in particular by forward and backward movement of the piston of the piston-cylinder unit, and has at least one pressure supply outlet.

PRIOR ART

WO2018215397A1 discloses a brake system for recuperating kinetic energy by means of the electric drive motor at a first axle, wherein the second axle is connected to the actuating unit. Furthermore, WO2018215397A1 discloses a recuperation braking management system with an electric motor and a brake system at one axle.

PPC pressure control systems with electrically driven piston-cylinder systems using pressure-volume characteristic curve, current and piston position are known for example from EP 1874602 B1, DE 102005055751 B3, DE 102005018649 B3, DE 102005063659 B3 and EP 1907253 B1, and multiplex pressure control is known from EP 1874602 B1 and DE 102005055751 B3.

For example, DE 102005055751 B3 discloses a brake system in which the pressure change in the wheel brakes is controlled using a pressure-volume characteristic curve, wherein the piston control is performed by means of motor current measurement and/or determination of the piston position (so-called PPC pressure control), wherein each wheel brake is assigned a switching valve and, during the pressure change, the switching valve assigned to the wheel brake is permanently open. To maintain the pressure in the respective wheel brake, the respective switching valve is closed.

DE 102005018649 B3 also discloses that, for the pressure control, a characteristic map is used which is adapted during operation. The purpose of the adaptation is to detect changes during operation, such as changes in the pressure-volume characteristic curve, owing to air inclusions in the hydraulic medium of the brake system.

DE 102005063659 B3 discloses pressure control by current control and booster characteristic curve. In the case of current control, the linear relationship between motor current (phase current) and motor torque, the so-called torque constant, is used in the pressure control and/or diagnosis if no pressure transducer is available as a measurement signal.

EP1907253B1 discloses a brake system with an actuating device, in particular in the form of a brake pedal, wherein the brake system has an open-loop and closed-loop control device which controls an electromotive drive device on the basis of the movement and/or position of the actuating device, wherein the drive device adjusts a piston of a piston-cylinder system, via a non-hydraulic transmission device that is fixedly coupled to the piston, such that a pressure is set in the working chamber of the cylinder, wherein the working chamber is connected to a wheel brake via a pressure line. A valve controlled by the open-loop and closed-loop control device is arranged in the pressure line to each wheel brake, wherein, in the event of failure of the drive device, the actuating device adjusts the piston or the drive device. Here, the electromotive drive device adjusts the piston via a rotor and a spindle drive that acts as a reduction transmission, such that the piston generates the pressure change required for the brake force boosting and the anti-lock brake system (ABS). The valve closes after the required brake pressure has been reached in the brake cylinder, and is also open during ABS operation both to set a new lower and a new higher brake pressure.

OBJECT OF THE INVENTION

To provide a brake system which is of simple, fail-safe and inexpensive construction and can be used for driving dynamics systems with central control of a vehicle for braking interventions in two brake circuits together, with recuperation of kinetic energy by means of electric motors in electric axle drives.

This object may be achieved by means of a brake system having features as set forth in the accompanying claims.

The brake system according to the invention is advantageously characterized in that it has a central brake management system with a central open-loop and closed-loop control device (M-ECU$_{BM}$) and slave open-loop and closed-loop control devices (E-ECU$_i$) for the electric axle drive motors (TM1, TM2) and an electrically driven pressure supply devices (DV1), such that, at multiple axles, setpoint braking torques can be specified for the electric traction motor(s) and for the hydraulic wheel brakes and thus for the pressure supply device. Here, the central brake management system may be arranged in an open-loop and closed-loop control device (M-ECU$_{BM}$) that is separate from the pressure supply device, or else the open-loop and closed-loop control unit (S-ECU$_{DV1}$) of the pressure supply device contains or forms the central brake management system. The central brake management system may be a software module of a central driving dynamics control system in accordance with the domain structure of modern electrically driven vehicles.

The brake system according to the invention can perform brake-circuit-specific control of the brake pressures and can also additionally use an electric drive motor, which is also referred to below as an electric traction motor, or multiple electric drive motors, which is/are arranged at the front axle and/or rear axle of a motor vehicle, to generate a deceleration torque and in so doing simultaneously convert kinetic energy into electrical energy by means of the traction motor(s), and thus recover said electrical energy (recuperation).

Here, the brake system according to the invention may advantageously be configured such that a braking torque can be set by closed-loop control on an axle-specific basis by means of the at least one traction motor and the pressure supply device in interaction for each axle.

With the 2-channel braking force control, axle-specific control in the context of the electrical braking force distribution (EBV) or simplified axle-specific ABS for 4-wheeled vehicles is combined with the recuperation using at least one electric motor.

In the embodiment described above, the pressure in the closed brake circuit is set, or set by closed-loop control, by means of the pressure supply device using the PPC method, and during closed-loop control operation, that is to say different wheel pressures in the brake circuits, in accordance with the disclosure of EP1907253B1, the pressure in the brake circuits is set, or set by closed-loop control, simultaneously, in a time-offset manner, in particular using the multiplex method, or partially simultaneously, that is to say with a time overlap. For this purpose, the brake system according to the invention has two connecting lines, which connect the pressure supply to the two brake circuits, wherein, in each connecting line, there is arranged a switching valve for selectively closing and opening the respective connecting line. The switching valve may be permanently open for the duration of the pressure change in the associated brake circuit, wherein the pressure change is then performed with the pressure supply of the pressure supply device.

The multiplex method of the solenoid valves offers all of the degrees of freedom of highly precise brake-circuit-specific control with simultaneously high fail safety of a closed brake circuit. In this way, dormant faults are advantageously avoided, and good, simple and reliable diagnosis of leaks is possible.

The pressure supply device can also be used to implement simplified control functions, that is to say simplified axle-specific ABS control operation, in the case of which the wheel pressures are controlled on an axle-specific basis, but not on a wheel-specific basis. This simplification, combined with the highly precise PPC pressure control, is sufficient for various applications, such as racing vehicles with two axles, where ABS/ESP control is not permitted. With the axle-specific braking force control (EBV function), more intense decelerations can be achieved at all wheels than with pure select-low control, because the braking force distribution can be divided in accordance with the axle load distribution at the front and rear axles, that is to say, in the event of intense decelerations, a lower pressure is set at the rear axle than at the front axle. In the case of road vehicles, too, the axle-specific control merely leads to limitations during μ-split operation, that is to say when the wheels on the right/left side of the vehicle are on ice and the wheels on the left/right side are on asphalt. In this case, the pressure is set such that none of the wheels locks. This leads to longer braking distances, but the vehicle can still be steered.

It is likewise possible that the brake system according to the invention is configured with an already known standard ABS/ESP unit, which is interconnected between the pressure supply device and the brake circuits. Here, the ABS/ESP function performs the wheel-specific control, and, in the event of failure of the ABS/ESP unit, the brake system according to the invention can still enable the axle-specific brake pressure control/axle-specific ABS function with recuperation, which means that the redundancy requirements for various levels of autonomous driving (AD), level 3 and level 4 (see ATZ [Automobiltechnische Zeitschrift, German automotive industry journal] article "Bremskraftverstärker für das autonome Fahren" ["Braking force boosters for autonomous driving"], issue 3/19), can be met. In addition, both brake modules can be applied separately and obtained from different suppliers, wherein the central brake management (M-ECU$_{BM}$) preferably takes place in the brake system according to the invention.

Particular advantages of the brake system according to the invention will be explained individually in more detail below:

advantageous possibility of incorporating the brake system and its brake control into a domain structure of a central driving dynamics control system, with the possibility of optimizing the entire driving dynamics and incorporating multiple control actuators for brakes, steering and damping, and also incorporating the electric traction motors;

the advantageous multiplex control (MUX control) or the precise PPC control can be used for the pressure build-up and/or pressure reduction, and thus allows very many degrees of freedom in the precise pressure control of multiple hydraulic actuators. In addition, a combination of MUX control and PPC control is possible, whereby very precise coordination with the at least one electric drive motor is possible, and at the same time brake-circuit-specific brake pressures can be set;

the EBV function, that is to say the electrical braking force distribution between the front axle and rear axle, can be implemented and applied much more easily and with higher control quality than in the case of known brake systems on the market, for example on the basis of the MKC1 brake system according to DE102013224313A1 or the brake system according to U.S. Pat. No. 9,981,645B2, because, in the known brake systems, the PPC method, MUX control and PWM control of outlet valves are not used for pressure build-up and pressure reduction, or can only be used partially owing to limitations of the hydraulic concept. For example, the MUX method requires valves that must maintain pressure in both directions. At the same time, the central driving dynamics control according to the invention can be used to supplement the braking torque of the electric motors in order to increase the dynamics and maximize the braking torque in the axle braking torque distribution. This allows an optimization of the braking deceleration taking into consideration different axle loads, for example, in the case of intense deceleration, significantly higher pressures at the front axle, or a different braking torque distribution requirement at the axles resulting from this; this feature is of importance for racing vehicles, for example rally vehicles with electric drives at the front and rear axles, or so-called supercars or hypercars with drive power>300 kW with simultaneously high dynamic requirements.

advantageous possibility of optimizing the braking torque build-up dynamics through simultaneous use of the hydraulic brake system and the electric motors, whereby it is for example possible to achieve a shorter time to reach the locking pressure, in particular in the case of emergency braking functions;

possibility of optimizing the recuperation performance by means of the electric motors, such that, at low vehicle speeds<120 km/h, the deceleration can be realized exclusively or substantially, in particular more than two thirds (⅔) of the deceleration can be realized, by means of one or both electric drive motor(s) (traction motor(s)). The deceleration performance is limited here by the maximum power and the maximum torque of the electric motor;

simple and reliable control of the brake pressures by means of the pressure supply device in multiplex operation (MUX operation) with very little expenditure on valves in the simultaneously closed brake circuit, that is to say without outlet valves that connect the brake circuits to the reservoir during closed-loop control operation, is possible. The omission of outlet valves has the advantage that the brake circuits are not hydraulically connected to the reservoir during active operation, and therefore undetected leaks in valves, for example owing to dirt particles in the valve seat (dormant faults), can be prevented or diagnosed, which increases reliability;

the brake system can advantageously be of modular construction for various embodiments, wherein some possible modular designs are listed below:

central brake management system as a separate unit or module of a central domain of the vehicle dynamics management system or part of the pressure supply device or of the control unit thereof;

individual modules that are taken together and assembled in various arrangements as required, such as a distributed system with separate actuating unit and separate control unit;

distributed system with separate actuating unit, in particular balance beam solution with master brake cylinders arranged parallel for in each case one brake circuit for the brake-circuit-specific hydraulic actuation by driver the driver with and separate control unit;

separate ABS unit or wheel pressure control unit, which distributes brake circuit pressures between different wheels, is easily configurable and connectable to the pressure supply device configured as a module, wherein this is also applicable separately for wheel-specific control at the axles;

ABS/ESP control unit as a standalone system with a dedicated pressure supply (redundancy) or simple valve control unit using the admission pressure control by the brake system;

Possible Areas of Application for the Brake System According to the Invention

The brake system according to the invention can be advantageously used for the following vehicle types:

for brake systems for racing vehicles with the functionality of highly dynamic and precise axle-specific braking torque control in the context of EBV optimization (EBV=electronic braking force distribution) and simultaneous recuperation by means of at least one electric motor at one or two axles;

for vehicles without or with only axle-specific ABS control, for example in racing, test vehicles for the development of central vehicle dynamics control systems with electric motors at multiple axles or vehicles with low ABS control requirements, such as low-speed people-mover vehicles;

for low-cost vehicles in BRIC countries, where axle-specific, brake-circuit-specific ABS control is sufficient and the power steering is used for vehicle stabilization purposes;

modularly supplementable by separately operating ABS/ESP control unit, wherein both units can then be obtained from separate brake manufacturers and can also be applied separately for the vehicle, wherein the application of the primary brake system according to the invention can be performed by the vehicle manufacturer.

Possible embodiments of the brake system according to the invention will be discussed in more detail below with reference to drawings.

Figure 1:
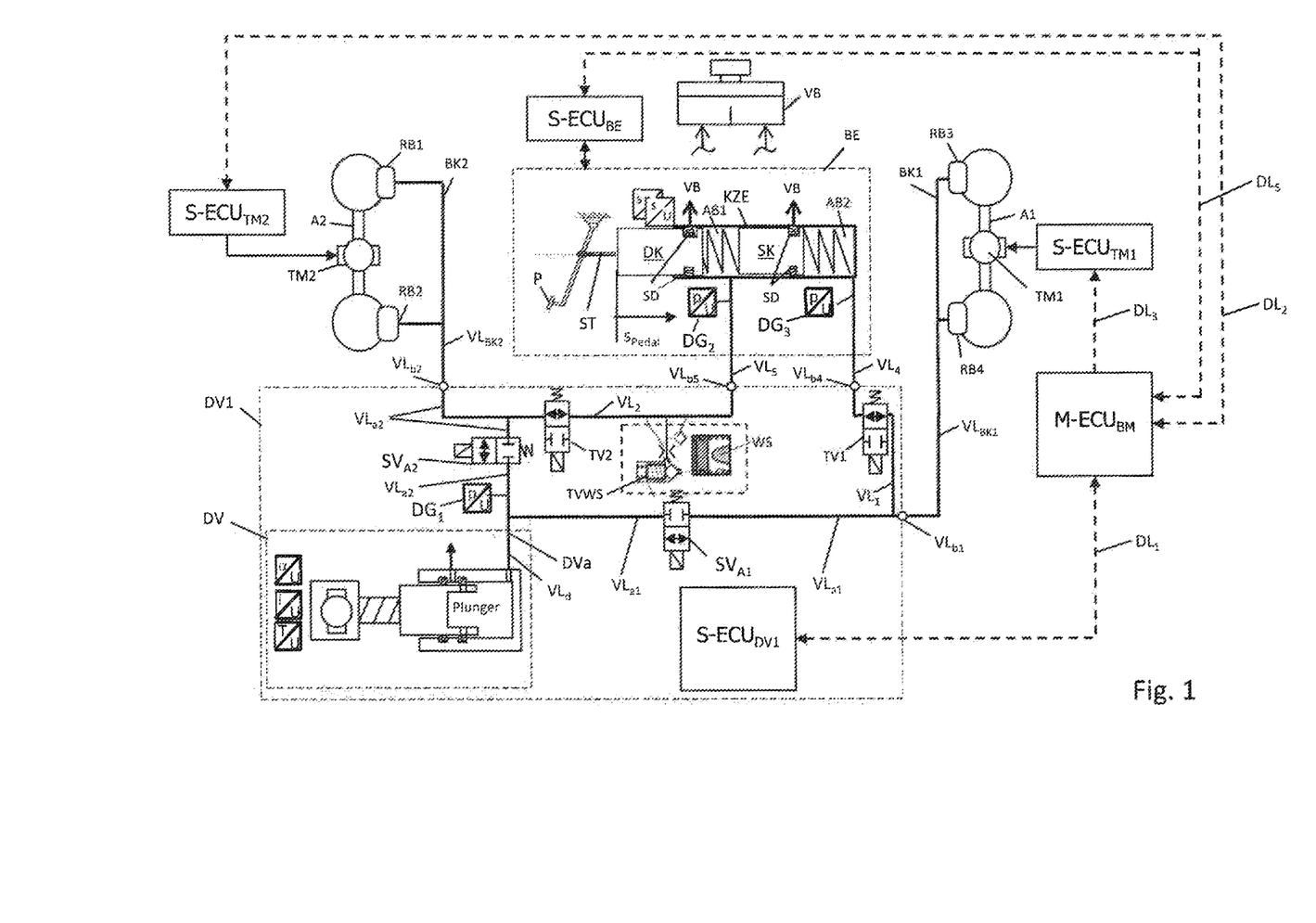
FIG. 1: shows a first possible embodiment of a brake system according to the invention with a modular construction with a tandem master brake cylinder THZ and a two-circuit fall-back level at the front axle and rear axle.

FIG. 1 shows a first possible embodiment of a brake system according to the invention with the central control according to the invention by means of a central open-loop and closed-loop control device M-ECU$_{BM}$, which sends control signals to the open-loop and closed-loop control device S-ECU$_{DV1}$ of the pressure supply unit DV1 of the brake system and to the open-loop and closed-loop control devices S-ECU$_{TM1}$, S-ECU$_{TM2}$ of the traction motors and reads in driver demand signals from the open-loop and closed-loop control device S-ECU$_{BE}$ of the actuating unit BE. The brake system is of modular construction and has a separate actuating unit BE and pressure supply device DV.

The actuating device BE has a brake pedal P and an actuating rod ST, which acts on a tandem master brake cylinder THZ, which in turn is configured with a pressure piston DK and pressure piston working chamber AB1 and a floating piston SK and floating piston pressure working chamber AB2. Sensors for detecting the pedal travel and pressure transducers DG2 and DG3 for redundant driver demand detection are provided. Alternatively, only one pressure transducer DG2 or DG3 may be used in the actuating unit BE, or the pressure transducer in the pressure supply may be omitted entirely if a force-travel sensor system KWS according to WO 2012059175A1 is used for force measurement. The pressure chambers AB1, AB2 of the pressure piston DK and of the floating piston SK are connected via breather hole seals SD to the reservoir VB for the purposes of volume replenishment. The actuating unit BE is isolated from the pressure supply DV/DV1 by means of isolating valves TV1 and TV2.

The pressure supply device DV is composed of an electrically driven piston-cylinder unit with sensors for detecting the angular position α of the rotor, motor current i and temperature T, and an HCU with pressure transducer DG1, switching valves TV1, TV2 for isolating the master brake cylinder from the brake circuits for brake-by-wire operation, and switching valves SVA1 and SVA2 for the brake-circuit-specific control by means of the pressure supply device DV. Additionally, a travel simulator WS is provided, which is hydraulically connected to the pressure chamber AB1 of the pressure piston via the line VL$_5$ and which can be shut off by means of a travel simulator shut-off valve TVWS.

For the control of the brake pressure in a manner coordinated with the recuperation control by means of the electric motor TM2 or TM1 of an axle, use is made of the PPC control method with evaluation of the angular position α of the rotor of the electric motor, current i of the electric motor and optionally temperature T of the motor, supplemented by the evaluation of a pressure-volume characteristic curve according to the prior art, which is preferably adapted during operation. If a temperature sensor is used, the temperature T of the electric motor is used to adapt the relationship between the current and torque of the electric motor, because the torque constant kt decreases linearly as a function of the temperature T. This is advantageously used in order to implement precise dynamic pressure change control, because the control by way of the current i is more dynamic, because pressure transducers exhibit a time delay in the detection of the actual value. The pressure transducer is primarily then used for the setpoint pressure control if the exact setting of the setpoint pressure is of importance, though may also be used for the entirety of the control. In addition, the pressure transducer is used to calibrate the pressure-volume characteristic curve that varies during operation, for example owing to air inclusions. If the pressure transducer fails, control is performed exclusively by way of the current i, the angular position α and the pressure-volume characteristic curve, whereby additional redundancy is realized.

The switching valves SVA1 and SVA2 are configured as normally closed valves in order to isolate the pressure supply DV from the actuating unit BE in the fall-back level. For the simultaneous control of both axles, the multiplex method (MUX method) according to the prior art is used.

Figure 1A:
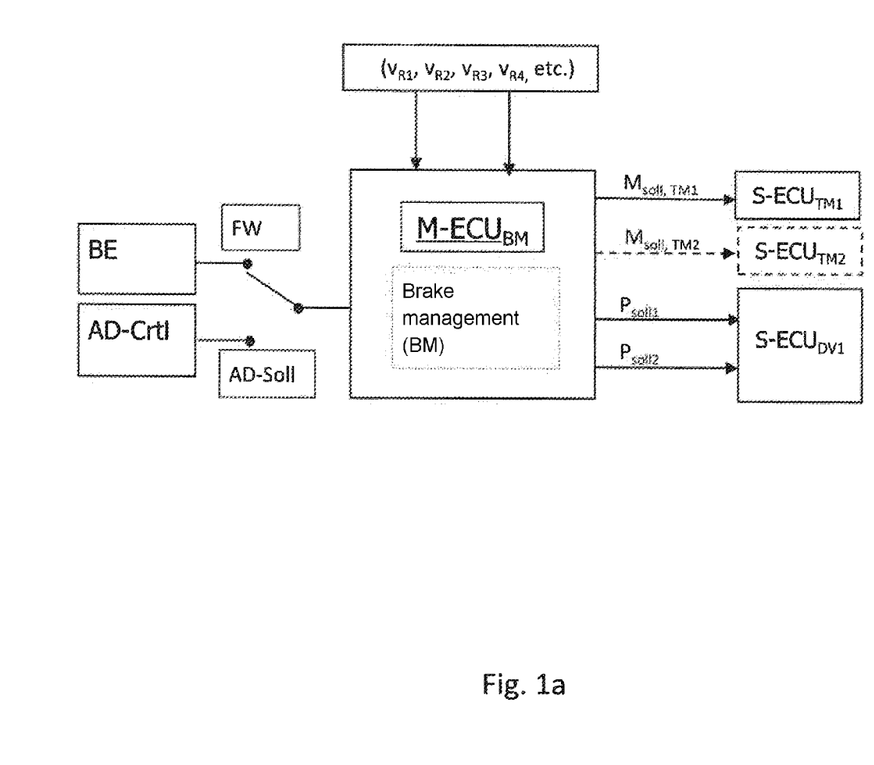
FIG. 1*a*: shows a first possible embodiment of a central brake management system for a brake system for driver-demand-based control (FW) or alternative control in the case of autonomous driving (AD-Ctrl)

FIG. 1a shows the construction of a central brake management system in embodiment A a brake system for example according to FIG. 1, wherein for the control is performed in accordance with driver demand (FW) by means of an actuating unit BE or, alternatively, in autonomous driving operation (AD-Ctrl), setpoint signals AD-Soll for the brake management system (BM). Here, the wheel speeds $V_{R1}$, $V_{R2}$, $V_{R3}$, $V_{R4}$ are also taken into consideration. Here, the brake management system transmits setpoint torques $M_{soll}$ to the control systems S-ECU$_{TM1/TM2}$ of the traction motor(s) and setpoint pressures $p_{soll1}$, $p_{soll2}$ for the pressure supply to the control unit S-ECU$_{DV1}$ for the pressure supply device DV1. The setpoint pressures $p_{soll1}$ and $p_{soll2}$ are the control signals that the pressure supply device DV1 should set in the brake circuits BK1 and BK2 for the brake-circuit-specific control. In the case of driverless vehicles, the actuating unit may be omitted, and the system is operated purely in AD-Ctrl operation.

The following functions are then preferably implemented in the central brake management system:
- axle-specific pressure control for recuperation (recuperation),
- braking force distribution (EBV),
- axle-specific ABS for four-wheeled vehicles, ABS for two-wheeled vehicles.

Figure 1B:
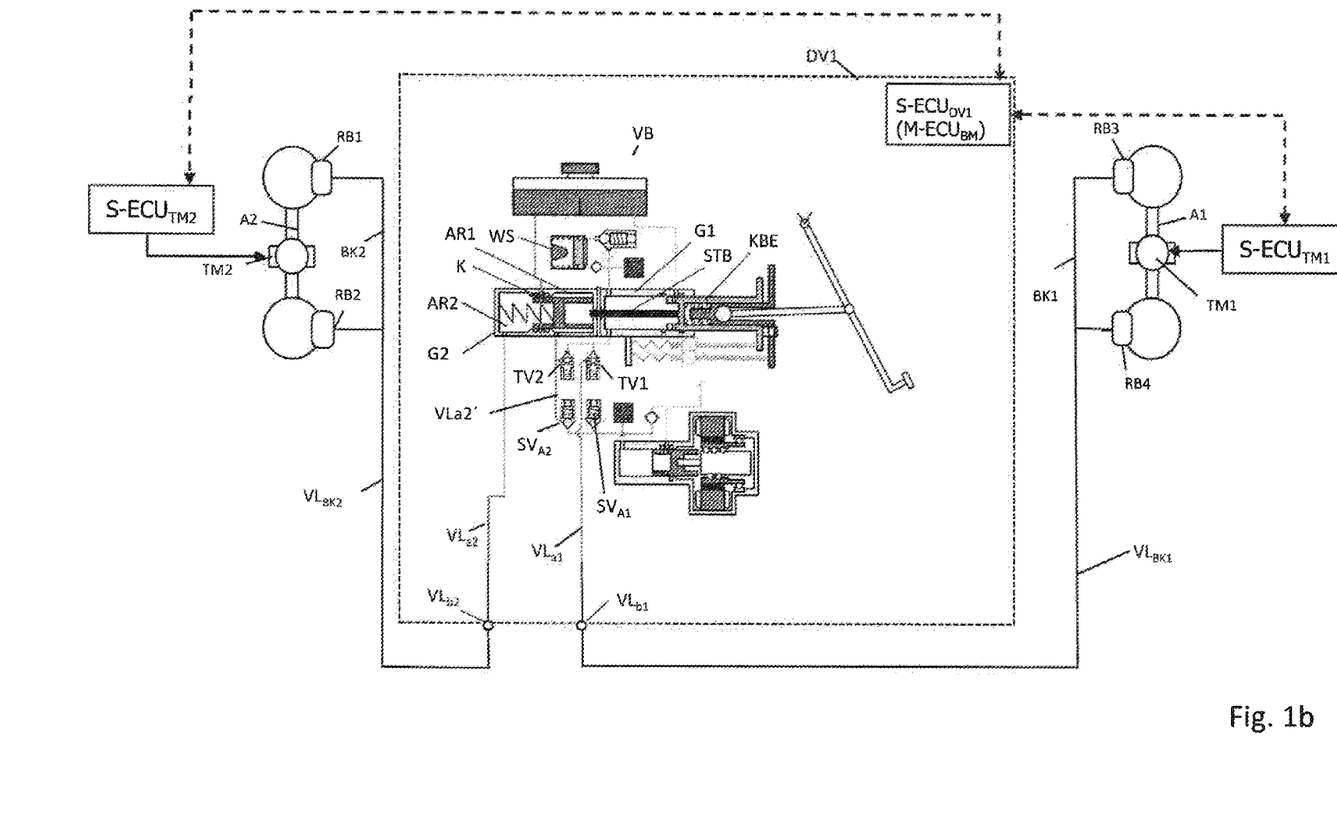
FIG. 1*b*: shows a further possible embodiment of the brake system, in which the second brake circuit is connected to the pressure supply device via the piston-cylinder unit of the actuating device and the switching valve is arranged between the piston-cylinder unit and the pressure supply of the pressure supply device.

FIG. 1b shows the X-Boost electric braking force booster of a 2-box brake system, as defined in WO2018233854A1—page 4, and described in the text of the patent. The X-Boost is used in WO2018233854A1 with an ESP system. By contrast to the disclosure, the X-Boost is operated as a stand-alone unit without the 2nd box (ESP unit) and has two switching valves SVA1 and SVA2 for the individual operation of the brake circuits BK1 and BK2. The pressure is controlled by means of the pressure supply DV by forward and backward movement of the piston of the pressure supply, wherein the pressure is transmitted via a hydraulic connection and SV$_{A1}$ valve to the brake circuit BK1 and then via the floating piston K and SV$_2$ valve into the brake circuit BK2. The switching valves are preferably of normally open design, whereby the previously implemented brake-circuit-specific simultaneous or partially simultaneous pressure profile control by way of PPC control of the piston of the pressure supply DV, in one brake circuit supplemented by PWM control or current control of the switching valves SVA1 and SVA2, is or can be realized. The multiplex method may also be used here as an alternative or in addition to PWM control.

The ECU of the X-Boost is implemented here as a slave ECU S-ECU$_{DV1}$ or master ECU$_{BM}$. In the embodiment as S-ECU$_{DV1}$, the control of the X-Boost is integrated into a central control system, and in the embodiment as master ECU$_{BM}$, the ECUs of the traction motor TM1 or TM2 of one axle or of two traction motors at 2 axles are controlled by means of the control electronics of the X-Boost. The recuperation control is thus optimally combined with the brake-circuit-specific brake circuit control.

The pressure supply DV is designed as a piston pump which is driven by means of an electric motor and a spindle drive.

The first piston of the actuating unit BE is used for driver demand detection and for the fall-back level. In the fall-back level, that is to say in the event of failure of the pressure supply, the pressure is conducted via isolating valves TV1 into brake circuit BK1 and via TV2 and floating piston K into brake circuit BK2. In addition, a plunger STB is optionally provided, which in the fall-back level can act directly on the floating piston K.

The two pistons of the actuating unit BE are arranged in one housing. Alternatively, the piston KBE of the actuating unit BE may be arranged in a first housing and the floating piston K may be arranged in a second housing. A separation of the housings allows for a construction of the brake system that is advantageous from a manufacturing aspect. In the context of the modular design, this construction can, using the same production technology, be expediently modified for an electric pedal solution with a separate actuating unit and pressure generator with solenoid valves.

Figure 2:
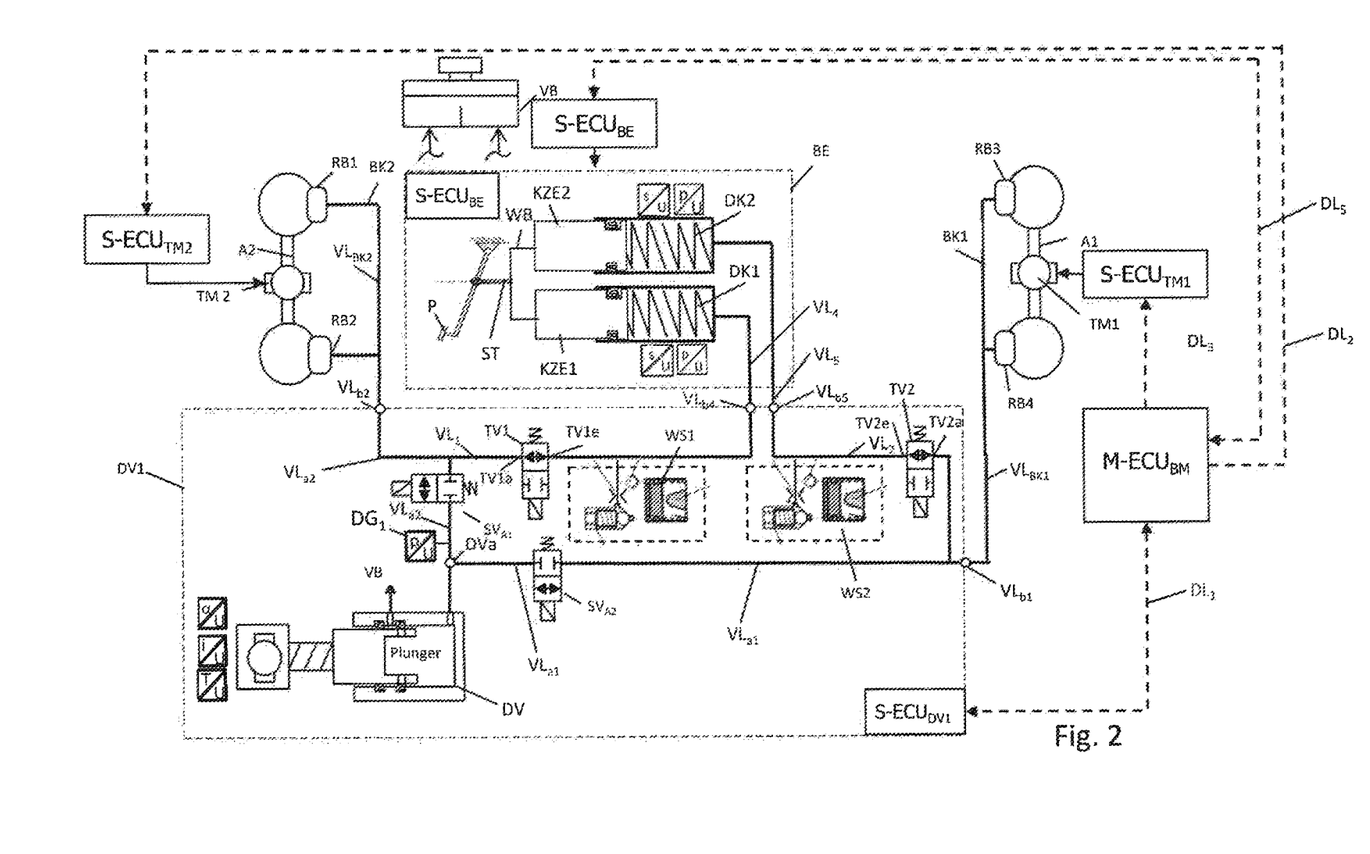
FIG. 2: shows a modification of the embodiment as per FIG. 1 with a balance beam solution with two travel simulators.

FIG. 2 shows a modification of the embodiment as per FIG. 1 with a balance beam solution with two travel simulators. The balance beam makes it possible to adjust the brake balance of the vehicle even in the fall-back level. The balance beam WB connects the actuating rod ST and the two individual pressure pistons KZE1 and KZE2 such that a displacement of the balance beam WB changes the point of engagement of the actuating rod ST between the two pressure pistons. In accordance with the lever principle, the force of the actuating rod ST is divided between the two pressure pistons KZE1 and KZE2 in a manner inversely proportional to the lever arm lengths. A different pressure is consequently set in the two pressure chambers DK1 and DK2.

In order to prevent twisting of the balance beam WB, it is expedient to connect not only a first travel simulator module WS1 but also a second travel simulator module WS2 to the line VL2, such that both pressure pistons KZE1 and KZE2 can transport a similarly large volume into the pressure supply unit DV1. Otherwise, the embodiment is similar or functionally identical to the variant described in FIG. 1 in terms of hydraulic construction: isolating valves TV1 and TV2 for isolating the actuating unit from the brake circuits and switching valves SVA1 and SVA2 for PPC and MUX control.

What is claimed is:
1. A brake device for a motor vehicle with two axles, including:
at least one electric traction motor arranged for driving and braking at least one wheel arranged on at least one of the axles, wherein energy is enabled to be recovered by means of the traction motor during braking, respective wheel brakes coupled to wheels of the motor vehicle,
a pressure supply, having a pump which is driven by an electric motor, and which is in the form of a piston-cylinder unit,
wherein the pressure supply is able to both build up pressure and reduce pressure in the wheel brakes, by forward and backward movement of the piston of the piston-cylinder unit, and has at least one pressure supply outlet,
an actuating device with brake pedal, in the form of a hydraulic actuating unit with a travel simulator or an electric pedal,
wherein the pressure supply is part of a pressure supply device, wherein the pressure supply device has at least two outlet lines and at least two connections enabling connection to brake circuits, an ABS/ESP unit, and/or an actuating unit,
wherein each connection is enabled to be isolated from the pressure supply by means of at least one switching valve, and
wherein each outlet line is hydraulically connected to the pressure supply outlet directly or via a connecting line, and
an open-loop and closed-loop control device arranged to control the at least one electric traction motor and components of the pressure supply device such that, by the interaction of the pressure supply device and the at least one electric traction motor, a braking deceleration is enabled to be set by closed-loop control individually for each brake circuit, each axle, or the wheel brakes of an axle with different braking torques at the respective axles or wheel brakes of wheels arranged on an axle,
wherein there are two brake circuits, and wherein the two brake circuits are selectively connected by a hydraulic connection line with a switchable valve disposed in the hydraulic connection line.

2. The brake device according to claim 1, further including:
a first sensor arranged to detect an angular position of a rotor of the electric motor; and
a second sensor arranged to detect a motor current of the electric motor,
wherein the first and second sensors are electrically coupled to the open-loop and closed-loop control device to provide the detected angular position and the detected motor current to the open-loop and closed-loop control device to control a position of the piston of the piston-cylinder unit.

3. The brake device according to claim 2, further including a third sensor arranged to detect a temperature of the electric motor and electrically coupled to provide the detected temperature to the open-loop and closed-loop control device to enable temperature-based adaptation of a relationship between the angular position and the motor current.

4. The brake device according to claim 2, wherein control of the piston is performed further based on evaluation of an adaptive pressure-volume characteristic.

5. The brake device according to claim 1, wherein piston pressure control (PPC) is employed in combination with control of the respective switching valves to selectively effect pressure control in one or more of the brake circuits.

6. The brake device according to claim 5, wherein the pressure control in the one or more of the brake circuits is performed in coordination with control of the at least one electric traction motor.

7. The brake device according to claim 1, wherein the open-loop and closed-loop control device comprises a master electronic control unit communicatively coupled to at least two slave electronic control units, wherein at least one of the slave electronic control units is arranged to control operation of the pressure supply and at least one of the slave electronic control units is arranged to control operation of the at least one electric traction motor.

8. The brake device according to claim 7, wherein the at least one slave electronic control unit arranged to control operation of the pressure supply also serves as the master electronic control unit.

9. The brake device according to claim 7, wherein the master electronic control unit is configured to receive signals representing information about the actuating unit and wheel speeds, to transmit at least one signal representing a setpoint torque to the at least one of the slave electronic control units arranged to control operation of the at least one electric traction motor, and to transmit at least one signal representing a setpoint pressure to the at least one slave electronic control unit arranged to control operation of the pressure supply.

10. The brake device according to claim 1, wherein open-loop and closed-loop control device is arranged to implement at least: (a) axle-specific pressure control for recuperation; (b) electrical braking force distribution between axles; and (c) anti-lock braking.

11. A method of operating a brake device, the method including:
detecting an angular position of a rotor of an electric motor that drives a piston of a piston-cylinder unit of a pressure supply device of the brake system, wherein the pressure supply device is configured to supply hydraulic pressure to brake circuits of the brake system;
detecting a motor current of the electric motor;
controlling the electric motor to set a position of a piston of the piston-cylinder unit based on the detected angular position and the detected motor current, and also based on evaluating an adaptive pressure-volume characteristic; and
selectively connecting the brake circuits via a hydraulic connection line using a switchable valve disposed in the hydraulic connection line.

12. The method according to claim 11, further including:
detecting a temperature of the motor and performing said controlling additionally based on the detected temperature.

13. The method according to claim 11, further including:
controlling one or more traction motors associated with vehicle axles to implement recuperative braking in addition to hydraulic braking.

14. The method according to claim 13, further including implementing electronic braking force distribution or implementing anti-lock braking, wherein the anti-lock braking is axle-specific in the case of a four-wheeled vehicle.

15. A driving dynamics system, comprising:
a first axle with wheels and a second axle with wheels;
at least one electric traction motor disposed to drive and brake at least one of the wheels, wherein energy is enabled to be recovered during braking using the at least one traction motor;
hydraulic wheel brakes to brake the wheels;
a pressure supply unit having a pressure supply device with a piston-cylinder unit driven by an electric motor, wherein the pressure supply device is designed to both build up and reduce pressure in two hydraulic brake circuits, wherein the two hydraulic brake circuits are selectively connected by a hydraulic connection line with a switchable valve disposed in the hydraulic connection line; and a central brake management system implemented as an executable software module stored in a non-transitory medium of the driving dynamics system, wherein the executable software module is designed to control the at least one electric traction motor and the pressure supply unit such that, in interaction between the pressure supply unit and the at least one electric traction motor, a braking deceleration is able to be set individually for each axle and/or for each wheel brake to enable implementation of an electrical braking force distribution between the first axle and the second axle with simultaneous recuperation.

* * * * *